(12) United States Patent  
Yokoyama et al.

(10) Patent No.: US 9,356,309 B2  
(45) Date of Patent: May 31, 2016

(54) PRISMATIC BATTERY

(75) Inventors: Yoshinori Yokoyama, Tokushima (JP); Yasuhiro Yamauchi, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 65 days.

(21) Appl. No.: 14/241,854

(22) PCT Filed: Aug. 24, 2012

(86) PCT No.: PCT/JP2012/071389  
§ 371 (c)(1),  
(2), (4) Date: Feb. 27, 2014

(87) PCT Pub. No.: WO2013/031668  
PCT Pub. Date: Mar. 7, 2013

(65) Prior Publication Data  
US 2014/0212718 A1 Jul. 31, 2014

(30) Foreign Application Priority Data  
Aug. 31, 2011 (JP) ................................. 2011-188514

(51) Int. Cl.
| | |
|---|---|
| *H01M 4/00* | (2006.01) |
| *H01M 10/04* | (2006.01) |
| *H01M 2/26* | (2006.01) |
| *H01M 2/02* | (2006.01) |
| *H01M 2/30* | (2006.01) |

(52) U.S. Cl.  
CPC .......... *H01M 10/0431* (2013.01); *H01M 2/024* (2013.01); *H01M 2/028* (2013.01); *H01M 2/26* (2013.01); *H01M 2/0217* (2013.01); *H01M 2/30* (2013.01)

(58) Field of Classification Search  
CPC ...... H01M 2/0217; H01M 2/021; H01M 2/30  
See application file for complete search history.

(56) References Cited

U.S. PATENT DOCUMENTS

| | | |
|---|---|---|
| 2004/0191612 A1 | 9/2004 | Akita |
| 2007/0105015 A1 | 5/2007 | Munenaga |

FOREIGN PATENT DOCUMENTS

| | | |
|---|---|---|
| CN | 1534810 A | 10/2004 |
| CN | 1934729 A | 3/2007 |
| JP | 2000-150306 A | 5/2000 |

(Continued)

OTHER PUBLICATIONS

International Search Report of PCT/JP2012/071389, mailing date of Nov. 20, 2012.

*Primary Examiner* — Jane Rhee  
(74) *Attorney, Agent, or Firm* — Westerman, Hattori, Daniels & Adrian, LLP

(57) ABSTRACT

Provided is a prismatic battery resistant to the development of short circuits. The prismatic battery has a structure in which a flat electrode including a positive electrode collector with a positive electrode substrate exposed portion and a negative electrode collector with a negative electrode substrate exposed portion is accommodated in an outer can. At least one of the positive electrode collector and the negative electrode collector has a rib. The rib is provided with an easily bendable part (a thin wall, groove, opening, or notch). The rib is bent at the easily bendable part when force is applied to the tip of the rib to prevent the tip from reaching the outer can by means of an insulation sheet to avoid the development of short circuits between the negative electrode collector and the outer can.

20 Claims, 8 Drawing Sheets

(56) References Cited

FOREIGN PATENT DOCUMENTS

| | | |
|---|---|---|
| JP | 2004-253295 A | 9/2004 |
| JP | 2004-303500 A | 10/2004 |
| JP | 2005-183332 A | 7/2005 |
| JP | 2009-032640 A | 2/2009 |
| JP | 2009-289593 A | 12/2009 |
| JP | 2011-216402 A | 10/2011 |
| JP | 2012-138337 A | 7/2012 |
| JP | 2012-138344 A | 7/2012 |
| KR | 2004-0086606 A | 10/2004 |
| WO | 2005/062403 A1 | 7/2005 |

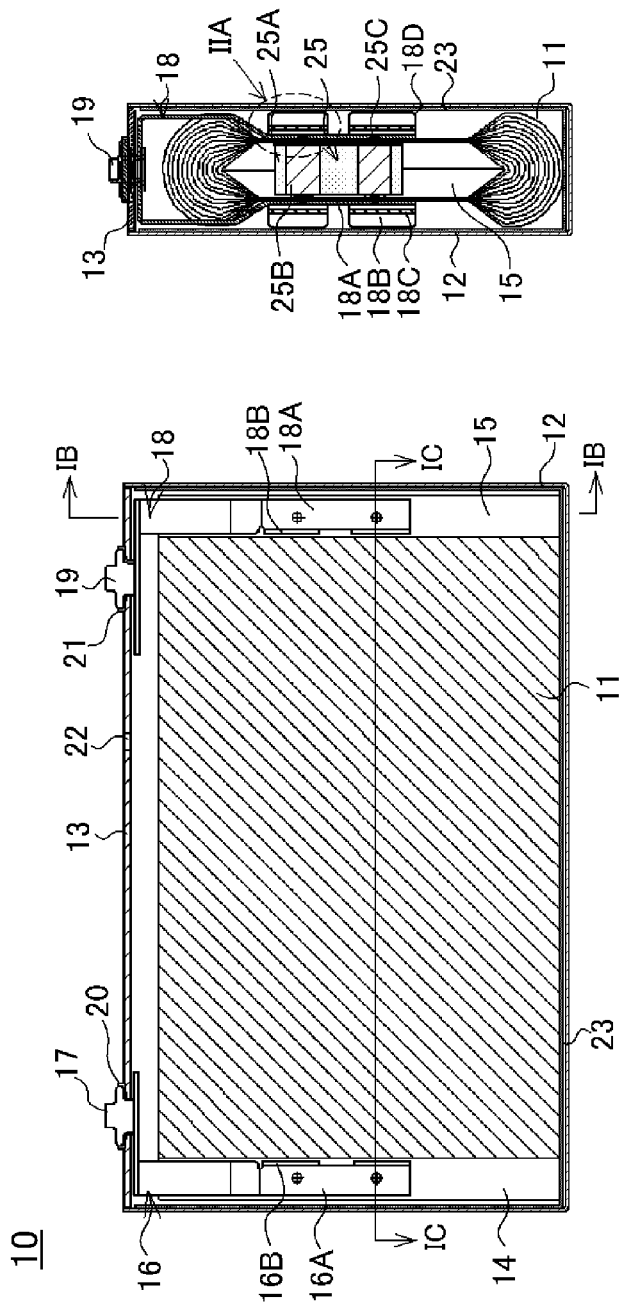
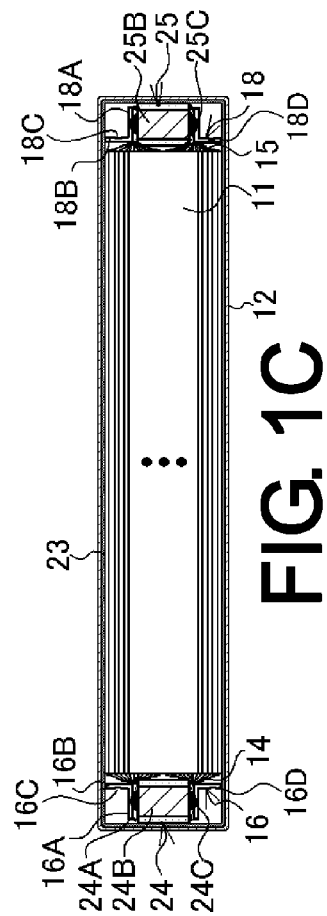

PRISMATIC BATTERY

TECHNICAL FIELD

The present invention relates to a prismatic battery in which a current collector provided with a lib is connected with at least one of the positive electrode substrate exposed portion and negative electrode substrate exposed portion of a flat electrode assembly.

BACKGROUND ART

In response to recent environmental protection movement, a regulation of exhaust gas such as carbon dioxide gas which is a cause of global warming has been strengthened. This is the reason why electric vehicles (EVs) and hybrid electric vehicles (HEVs or PHEVs) are actively developed in place of automobiles using fossil fuels such as gasoline, diesel fuel oil, and natural gas in the automotive industry. Nickel-hydrogen secondary batteries and lithium ion secondary batteries are used as these EV, HEV, or PHEV secondary batteries. In recent years, many nonaqueous electrolyte secondary batteries such as lithium ion secondary batteries have been used because light-weight and high-capacity batteries can be obtained.

Generally, as EV, HEV, or PHEV secondary batteries, many prismatic secondary batteries produced by accommodating, in a prismatic outer can, a flat electrode assembly obtained by laminating or winding a positive electrode plate and negative electrode plate with a separator interposed therebetween are used. Since a large-current and high-output discharge operation is performed during the sudden acceleration or uphill travel of a vehicle, it is desired to reduce the internal resistance of a battery to the utmost. Though there are a mechanical caulking method, ultrasonic welding method, laser welding method, and resistance welding method as the method for collecting current by electrically bonding the electrode substrate exposed portion of an electrode plate with the current collector, a resistance welding method is suitable for batteries which need a large current and high output because this method enables economical production of a battery and production of a battery having a low resistance, and production a battery resistant to variations with time.

On the other hand, the number of positive electrode substrate exposed portions and negative electrode substrate exposed portions to be laminated in EV, HEV, or PHEV prismatic secondary batteries becomes very large because of a large capacity. Further, in EV, HEV, or PHEV nonaqueous electrolyte secondary batteries, aluminum or an aluminum alloy is used as many positive electrode substrates and positive electrode collectors and copper or a copper alloy is used as many negative electrode substrates and negative electrode collectors. These aluminum, aluminum alloys, copper, and copper alloys are materials having a small electric resistance and high heat conductivity and therefore need large welding energy to carry out resistance welding between the positive electrode substrate exposed portion and the positive electrode collector and between the negative electrode substrate exposed portion and the negative electrode collector without fail, to increase welding strength, thereby reducing the internal resistance of the welded part.

Sputters occur at the contact part between the electrode rod and current collector when the electrode substrate exposed portion of the electrode plate is bonded with the current collector by resistance welding. In order to prevent these sputters from diffusing to the electrode assembly side, a lib for preventing sputter diffusion is disposed on the electrode assembly side of the current collector. For example, Patent Literature 1 shown below discloses a method for producing a prismatic secondary battery in which, as shown in FIG. 8, a pair of current collectors 52 and 53 is arranged on each side of an electrode substrate exposed portion 51 of an electrode plate of a laminated or wound electrode assembly 50, a pair of resistance welding electrode rods 54 and 55 is brought into contact with both sides of the pair of current collectors 52 and 53 to conduct a welding operation while pressing the pair of resistance welding electrode rods 54 and 55 against each other.

Ribs 52a and 53a extended in a direction perpendicular to the electrode assembly 50 are formed on the electrode assembly 50 sides of the pair of current collectors 52 and 53 respectively. These ribs 52a and 53a are so formed that sputters 56 generated in the resistance welding between the electrode rod 54 and the current collector 52 and between the electrode rod 55 and the current collector 53 are each prevented from reaching the electrode assembly 50 side to thereby shield the electrode assembly 50. Ring-shaped insulation tapes 57 and 58 disposed between the current collector 52 and the electrode substrate exposed portion 51 and between the electrode substrate exposed portion 51 and the current collector 53 respectively serve to collect the sputters generated in the resistance welding between the current collector 52 and the electrode substrate exposed portion 51 and between the electrode substrate exposed portion 51 and the current collector 53 respectively in these ring-shaped insulation tapes 57 and 58.

CITATION LIST

Patent Literatures

Patent Literature 1: JP 2009-032640 A
Patent Literature 2: JP 2009-289593 A

SUMMARY OF INVENTION

Technical Problem

The method for producing a prismatic secondary battery which is disclosed in the above Patent Literature 1 produces the effect that the development of internal short circuits can be limited because the diffusion of sputters generated at the contact part between the electrode rod and the current collector can be prevented when the electrode substrate exposed portion of the electrode plate is bonded with the current collector by resistance welding. Such an effect is more produced with increase in the length of the rib. The rib of the current collector can also play a role in the registration of the flat electrode assembly in the prismatic outer can.

In EV, HEV, or PHEV prismatic secondary batteries, on the other hand, an insulation member such as a resin insulation sheet is usually disposed between the outer can and the current collector as a measure taken for the risks of development of short circuits between the outer can and the current collector when excess force is applied by, for example, heavy goods falling down on the side of a battery or by loads applied with foreign substances being pinched, causing the deformation of the side surface of the outer can when assembling a battery. However, since copper or a copper alloy used for the current collector on, particularly, the negative electrode side is hard, there is the possibility that the rib of the current collector penetrates through the resin insulation sheet when deforming the side surface of the outer can, resulting in the development of short circuit between the outer can and the current collector.

The present invention has made to solve prior art problems like those mentioned above and it is an object of the present invention to provide a prismatic battery in which a current collector provided with a lib is connected with at least one of the positive electrode substrate exposed portion and negative electrode substrate exposed portion of a flat electrode assembly, the battery having a structure resistant to the development of short circuits between the outer can and the current collector through the rib even if the side surface of the outer can is deformed by the influence of something.

Solution to Problem

The above object is attained by a prismatic battery of the present invention, the prismatic battery including a flat electrode assembly provided with a positive electrode substrate exposed portion laminated on one end thereof and a negative electrode substrate exposed portion laminated on the other end thereof, the flat electrode assembly being accommodated in an outer can and a current collector which is connected with the outermost surface of at least one of the laminated positive electrode substrate exposed portion and the laminated negative electrode substrate exposed portion in the laminated direction and is provided with the body of the current collector and a rib extended in a direction almost perpendicular to the body of the current collector, wherein an insulation member is disposed between the rib and the outer can and the rib is formed with an easily bendable part provided with a thin-wall part, groove part, opening part or notch part which narrows the width of the rib in a region excluding a tip part of the rib.

In the prismatic battery of the present invention, the rib of the current collector is easily bent at the easily bendable part even if the side surface of the outer can is deformed and the insulation member disposed on the inside surface of the outer can is brought into strong contact with the tip part of the rib of the current collector. For this, the prismatic battery of the present invention is resistant to the development of short circuits between the current collector and the outer can because the tip part of the rib scarcely penetrates the insulation member even if the side surface of the outer can is deformed.

Further, the rib formed on the current collector of the prismatic battery of the present invention also has the effect of preventing the diffusion of sputters when the current collector is bonded with the positive electrode substrate exposed portion or negative electrode substrate exposed portion by resistance welding and the effect of a radiation fin that serves to prevent the melting of parts other than the resistance welded part of the current collector. Further, the angle formed between the body of the current collector and the rib is preferably 90 degrees. The angle is unnecessarily 90 degrees and may be deviated by about ±10 degrees from 90 degrees. The current collector may have a structure in which the current collector is connected with each side of the laminated electrode substrate exposed portion or with only one side of the laminated electrode substrate exposed portion. Further, a structure in which a current collector is connected with an external terminal on only one surface of the laminated electrode substrate exposed portion and a current collector receiver which is an independent part is connected with the other surface of the laminated electrode substrate exposed portion is acceptable. In this case, though the current collector receiver which is an independent part is not connected directly with an external terminal, it is included in the current collector of the present invention. Further, the current collector may be a type which is directly connected with an external terminal or a type which is connected with an external terminal through a current interrupting mechanism doubling as a safety valve incorporated into, for example, a terminal and through an internal terminal.

In the prismatic battery of the present invention, the easily bendable part formed in the rib may be formed at a desired position including a position close to the current collector body or a position close to the tip of the rib as long as it is formed at a position excluding the tip (position most apart from the current collector body). If a thin-wall part, groove part, opening part, or notch part which narrows the width of the rib are formed at the tip of the rib, this rather increases the possibility that the tip of the rib breaks through the insulation member when external force is applied to the tip of the rib, which makes it difficult to produce the effect of the present invention. Further, as the thin-wall part, groove part, opening part, or notch part which narrows the width of the rib which form an easily bendable part, those each having a desired shape may be adopted.

Though it is enough for the easily bendable part formed in the rib of the current collector in the present invention that it is formed on at least one of the positive electrode plate side and negative electrode plate side, it is preferable to apply it to the rib of the current collector formed on at least the negative electrode plate in consideration of the mechanical strength of the structural material of the current collector when the present invention is applied to a nonaqueous electrolyte secondary battery. Further, the prismatic battery of the present invention may be applied to each flat type electrode assembly produced by winding or laminating a positive electrode plate and negative electrode plate with a separator interposed therebetween and may be applied any battery irrespective of whether it is a primary battery or secondary battery.

As the insulation member in the prismatic secondary battery of the present invention, a sheet-like one is preferable in consideration of productive easiness. Further, as the sheet-like insulation member, those made of resins, ceramics, or glass fibers may be used, and those made of resins are particularly preferable. Moreover, as this insulation member, an insulation layer applied to the inside wall of the outer can or an insulation layer such as an oxide layer or ceramic layer formed on the inside wall of the outer can may be adopted.

Further, in the prismatic battery of the present invention, the easily bendable part formed in the rib is preferably located within a region extended up to ⅔ of the length of the rib from the current collector body of the rib.

If the easily bendable part to be formed in the rib is formed within a region extended up to ⅔ of the length of the rib from the current collector body of the rib, the easily bendable part is bent more easily when external force is applied to the tip of the rib and therefore, short circuits between the current collector and the outer can are more scarcely developed.

Further, in the prismatic battery of the present invention, the rib is preferably more projected towards the outer can side than the electrode assembly.

According to the prismatic battery of the present invention, the rib is more projected towards the outer can side (outside) than the electrode assembly and therefore, the effect of preventing the diffusion of sputters is increased when the current collector is bonded with the positive electrode substrate exposed portion or negative electrode substrate exposed portion by resistance welding, and also, the movement of the electrode assembly in the outer can be prevented because the rib is allowed to contact with the outer can with the insulation member interposed therebetween. For this, the prismatic battery of the present invention becomes most suitable to a prismatic battery used under a circumstance with many vibrations in EVs and HEVs. When adopting such a structure, the rib tends to break through the insulation member if the easily bendable part is not formed. However, in the prismatic battery of the present invention, the easily bendable part is formed in the rib and therefore, the rib hardly breaks through the insulation member.

Further, in the prismatic battery of the present invention, the rib is preferably formed by folding back a part of the current collector.

According to the prismatic battery of the present invention, the rib is formed by folding back a part of the current collector and therefore, the current collector is easily produced.

Further, in the prismatic battery of the present invention, the rib is preferably formed at the base side of the current collector on the positive electrode substrate exposed portion side or negative electrode substrate part side.

According to the prismatic battery of the present invention, the rib is formed at a position close to the laminated part of the positive electrode plate, separator, and negative electrode plate on the electrode assembly, and therefore, in correspondence to this, sputters generated when the current collector is bonded with the positive electrode substrate exposed portion or negative electrode substrate exposed portion by resistance welding can be prevented from diffusing towards the electrode assembly, which makes it possible to limit the development of internal short circuits across the electrode assembly.

Further, it is preferable in the prismatic battery of the present invention, that at least one of the positive electrode substrate exposed portion and negative electrode substrate exposed portion be divided into two sections to form a two-divided portion is disposed, the intermediate member includes a resin material and at least one conductive intermediate member which is supported by the resin material, and the current collector on the two-divided electrode substrate exposed portion side be disposed on at least one outermost surface of the two-divided electrode substrate exposed portion and be electrically connected with the two-divided electrode substrate exposed portion together with the at least one conductive intermediate member of the intermediate member by a resistance welding method.

According to the prismatic battery of the present invention, the electrode substrate exposed portion divided into two sections by a series resistance welding method, the conductive intermediate member, and the current collector can be welded to each other at the same time even if the laminated positive electrode substrate exposed portion or negative electrode substrate exposed portion is thick. In addition, when a plurality of conductive intermediate members is formed, these conductive intermediate members are supported by and secured to the resin intermediate member, so that the dimensional accuracy between the plurality of conductive intermediate members is improved and also, these conductive intermediate members can be aligned and arranged in a stable state between the two-divided electrode substrate exposed portions, with the result that the quality of the resistance-welded part is improved and a battery having a lower resistance can be achieved. Therefore, according to the prismatic battery of the present invention, a prismatic battery which is improved in output and reduced in the dispersion of outputs is obtained.

BRIEF DESCRIPTION OF DRAWINGS

FIG. 1A is a sectional view of a prismatic nonaqueous electrolyte secondary battery of Embodiment 1, FIG. 1B is a sectional view along the line IB-IB of FIG. 1A, and FIG. 1C is a sectional view along the line IC-IC of FIG. 1A.

DESCRIPTION OF EMBODIMENTS

Figure 2A:
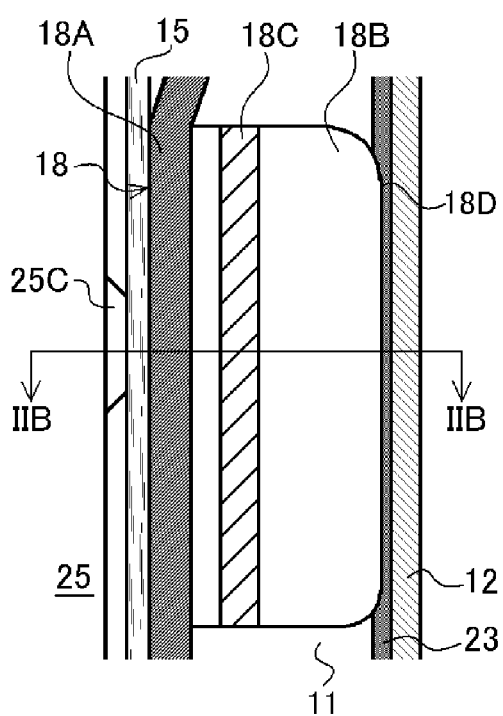
FIG. 2A is a partially enlarged view of the IIA part of FIG. 1B

Embodiments of the present invention will be explained in detail with reference to the drawings. Each embodiment shown below are examples for understanding the technical spirit of the present invention without intending to limit the invention to this embodiment and the invention may be equally applied to embodiments variously modified without departing the technical spirit shown in the scope of the appended claims. In each drawing used to explain in this specification, the members are illustrated in scales differentiated properly for each member to make each member have a size recognizable on the drawing and are unnecessarily illustrated in proportion to actual dimensions.

Further, the electrode assembly which may be used in the present invention may be applied to a flat-shaped one in which a positive electrode substrate exposed portion produced by laminating a plurality of positive electrode substrates on one end thereof and a negative electrode substrate exposed portion produced by laminating a plurality of negative electrode substrates on the other by laminating or winding a positive electrode plate and a negative electrode plate with a separator interposed therebetween. The following explanations will be furnished concerning a flat-shaped wound electrode assembly as a typical example.

Embodiment 1

First, a prismatic nonaqueous electrolyte secondary battery will be explained as an example of the prismatic battery of Embodiment 1 with reference to FIGS. 1 to 3.

Figure 2B:
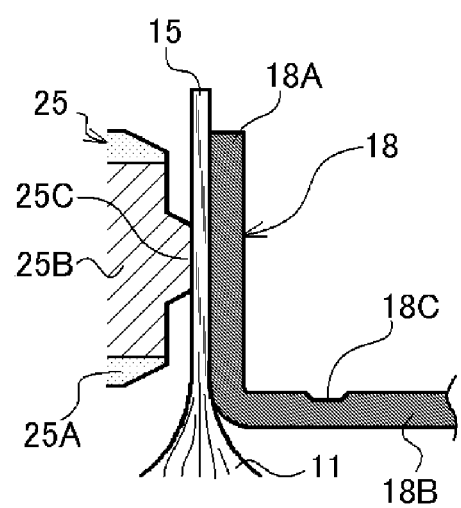
FIG. 2B is a sectional view along the line IIB-IIB of FIG. 2A.

FIG. 1A is a sectional view of a prismatic nonaqueous electrolyte secondary battery of Embodiment 1, FIG. 1B is a sectional view along the line IB-IB of FIG. 1A, and FIG. 1C is a sectional view along the line IC-IC of FIG. 1A. FIG. 2A is an enlarged view of the IIA part of FIG. 1B and FIG. 2B is a sectional view along the line IIB-IIB of FIG. 2A. FIG. 3 is a sectional side view illustrating the condition of an electrode substrate exposed portion and a current collector bonded with each other by resistance welding in Embodiment 1.

This prismatic nonaqueous electrolyte secondary battery 10 is provided with a flat wound electrode assembly 11 in which a positive electrode plate and a negative electrode plate are wound with a separator (illustration omitted) interposed therebetween. The positive electrode plate is manufactured by applying a positive electrode active material compound to each surface of a positive electrode substrate made of an aluminum foil, drying, rolling, and then, slitting in such a manner as to expose an aluminum foil part having a band form. The negative electrode plate is, on the other hand, manufactured by applying a negative electrode active material compound to each surface of a negative electrode substrate made of a copper foil, drying, rolling, and then, slitting in such a manner as to expose a copper foil part having a band form.

Then, the positive electrode plate and negative electrode plate obtained in the above manner are shifted such that the aluminum foil exposed part of the positive electrode plate and the copper foil exposed part of the negative electrode plate are not overlapped on each corresponding electrode active material layer to wind these plates with a polyethylene microporous separator interposed therebetween, thereby manufacturing a flat wound electrode assembly 11 provided with a layered positive electrode substrate exposed portion 14 on one end thereof in the direction of a winding axis and a layered negative electrode substrate exposed portion 15 on the other end thereof.

The plurality of positive electrode substrate exposed portions 14 are laminated and connected with a positive electrode terminal 17 through a positive electrode collector 16 and the plurality of negative electrode substrate exposed portions 15 are laminated and connected with a negative electrode terminal 19 through a negative electrode collector 18. Here, although the structure in which the positive electrode collector 16 and the negative electrode collector 18 are directly connected with the positive electrode terminal 17 and the negative electrode terminal 19 respectively is given as an example, the positive electrode collector 16 and the negative electrode collector 18 may be connected with the positive electrode terminal 17 and the negative electrode terminal 19 through other conductive members respectively. Further, the positive electrode terminal 17 or the negative electrode terminal 19 may be provided with a built-in current interrupting mechanism doubling as a safety valve.

Further, the positive electrode terminal 17 and the negative electrode terminal 19 are secured to a sealing plate 13 with insulation members 20 and 21 respectively interposed therebetween. This prismatic nonaqueous electrolyte secondary battery 10 of Embodiment 1 is manufactured by inserting the aforementioned produced flat wound electrode assembly 11 in a prismatic outer can 12 with an insulation sheet 23 being intervened around the electrode assembly 11 except for the sealing plate 13, by bonding the sealing plate 13 to the opening part of the outer can 12 by laser welding, and then by injecting a nonaqueous electrolyte solution from an electrolyte solution injection port 22, followed by closing the electrolyte solution injection port 22.

In the flat wound electrode assembly 11, as shown in FIGS. 1B and 1C, the plurality of layered positive electrode substrate exposed portions 14 is divided into two sections between which a positive electrode intermediate member 24 is disposed, on the positive electrode plate side. In the positive electrode intermediate member 24, a plurality (here, two) of conductive intermediate members 24B is disposed in an insulation intermediate member 24A made of resin material. Each conductive intermediate member 24B is formed with a circular truncated cone-shaped projection 24C which acts as a projection on the side opposite to the laminated positive electrode substrate exposed portion 14.

On the negative electrode plate side, similarly, the plurality of layered negative electrode substrate exposed portions 15 is divided into two sections between which a negative electrode intermediate member 25 is disposed. In the negative electrode intermediate member 25, a plurality (here, two) of conductive intermediate members 25B is disposed in an insulation intermediate member 25A. Each conductive intermediate member 25B is formed with a circular truncated cone-shaped projection 25C which acts as a projection on the side opposite to the laminated negative electrode substrate exposed portion 15.

Further, the positive electrode collector 16 is disposed on each outermost surface of the positive electrode substrate exposed portion 14 positioned on each side of the positive electrode intermediate member 24 and the negative electrode collector 18 is disposed on each outermost surface of the negative electrode substrate exposed portion 15 positioned on each side of the negative electrode intermediate member 25.

The conductive intermediate member 24B constituting the positive electrode intermediate member 24 is made aluminum which is the same material as the positive electrode substrate and the conductive intermediate member 25B constituting the negative electrode intermediate member 25 is made of copper which is the same material as the negative electrode substrate. However, the shapes of these conductive intermediate members 24B and 25B may be the same or different. Further, examples of the materials to be used for the insulation intermediate member 24A constituting the positive electrode intermediate member 24 and for the insulation intermediate member 25A constituting the negative electrode intermediate member 25 include polypropylene (PP), polyethylene (PE), polyvinylidene chloride (PVDC), polyacetal (POM), polyamide (PA), polycarbonate (PC), and polyphenylene sulfide (PP S).

Further, with regard to the prismatic nonaqueous electrolyte secondary battery 10 of Embodiment 1, as shown in FIGS. 1A, 1B, 2A, and 2B, a structure using two conductive intermediate members 24B and 25B in each of the insulation intermediate members 24A and 25A made of a resin material as the positive electrode intermediate member 24 and negative electrode intermediate member 25 is shown as an example. The number of units each constituted of these conductive intermediate members 24B and 25B may be one or three or more corresponding to the output required for a battery. If a structure using two or more conductive intermediate members is used, two or more conductive intermediate members 24B and 25B are disposed in each of the insulation intermediate members 24A and 25A made of one resin material and therefore, each unit of conductive intermediate members 24B and 25B can be aligned and located in a stable state between the two-divided side electrode substrate exposed portions.

The positive electrode collector 16 and the outermost surface of the two-divided positive electrode substrate exposed portion 14 and the conductive intermediate member 24B of the positive electrode intermediate member 24 and the internal surface of the two-divided positive electrode substrate exposed portion 14 are respectively bonded with each other through the circular truncated cone-shaped projection 24C formed on the conductive intermediate member 24B by resistance welding. Similarly, the negative electrode collector 18 and the outermost surface of the two-divided negative electrode substrate exposed portion 15 and the conductive intermediate member 25B constituting the negative electrode intermediate member 25 and the internal surface of the two-divided negative electrode substrate exposed portion 15 are respectively bonded with each other through the circular truncated cone-shaped projection 25C formed on the conductive intermediate member 25B by resistance welding.

Figure 3:
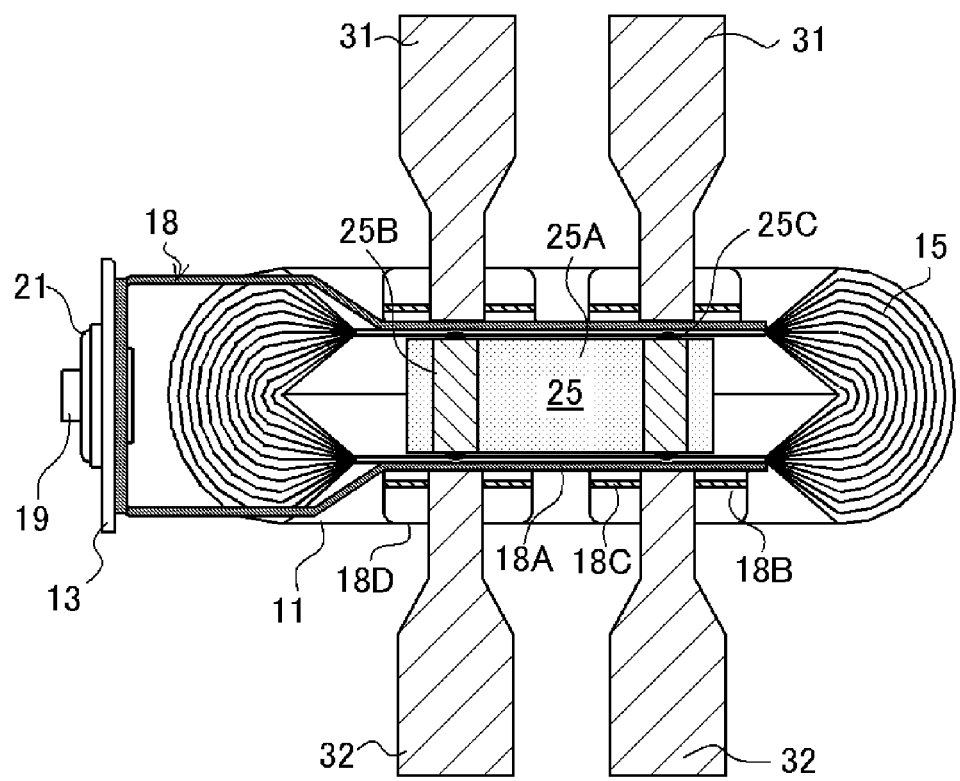
FIG. 3 is a sectional side view illustrating the condition of an electrode substrate exposed portion and a current collector bonded with each other by resistance welding in Embodiment 1.

The following explanations are furnished in detail as to a specific method of producing a flat wound electrode assembly 11, as to a resistance welding method using the positive electrode substrate exposed portion 14, positive electrode collector 16, and positive electrode intermediate member 24 provided with the conductive intermediate member 24B, and as to a resistance welding method using the negative electrode substrate exposed portion 15, negative electrode collector 18, and positive electrode intermediate member 25 provided with the conductive intermediate member 25B with reference to FIGS. 2 and 3. However, since, in Embodiment 1, the positive electrode intermediate member 24 may be designed to have substantially the same shape as the negative electrode intermediate member 25 and the both resistance welding methods are substantially the same as each other, the negative electrode plate side structure is explained as a typical example.

First, a flat wound electrode assembly 11 was manufactured which was obtained by winding the positive electrode plate and negative electrode plate with a polyethylene porous separator interposed therebetween in such a manner that the aluminum foil exposed part of the positive electrode plate and the copper foil exposed part of the negative electrode plate are shifted so as not to overlap on each opposite electrode active material. Then, the negative electrode substrate exposed portion 15 is divided into two sections at the winding center and the negative electrode substrate exposed portion 15 was assembled in the center of the plane at a height of ¼ of the thickness of the electrode assembly. Here, the thickness of the assembled copper foil on one surface is about 450 µm.

The negative electrode collector 18 was manufactured by punching a copper plate 0.8 mm in thickness, followed by, for example, bending processing. In this case, this negative electrode collector 18 may be manufactured, for example, by casting from a copper plate. The negative electrode collector 18 used here is formed with a body part 18A extended to the negative electrode terminal 19 from the resistance-welded position, a rib 18B extended in a direction almost perpendicular to the body part at the welded position, and a groove part 18C which is formed on the surface of the rib 18B in an easily bendable manner by partially reducing the thickness of the rib 18B, and these parts are integrated such that they have a structure symmetrical with respect to the negative electrode terminal 19. The details of the structures and functions of the rib 18B and groove part 18C of the negative electrode collector 18 will be described later.

Then, the negative electrode collector 18 is disposed on each outermost surface of the two-divided negative electrode substrate exposed portions 15 and the negative electrode intermediate member 25 is inserted into between the two-divided negative electrode substrate exposed portions 15 such that the circular truncated cone-shaped projection 25C on each side of the conductive intermediate member 25B contacts with the inside surface of each two-divided negative electrode substrate exposed portion 15. The conductive intermediate member 25B of the negative electrode intermediate member 25 has, for example, a columnar form and formed with a circular truncated cone-shaped projection 25C on each end thereof. The height of the circular truncated cone-shaped projection 25C may be almost the same as that of a projection usually formed in a resistance-welded member, that is, about several millimeters.

Further, the diameter and length of the conductive intermediate member 25B constituting the negative electrode intermediate member 25 may be about 3 mm to tens of millimeters though they differ depending on the size of the flat wound electrode assembly 11 or outer can 12 (see FIG. 1). Here, although the explanations are furnished on the premise that the conductive intermediate member 25B constituting the negative electrode intermediate member 25 has a columnar form, any form may be used as long as it is a metal block form such as a prismatic form and elliptic cylinder form.

The negative electrode intermediate member 25 of Embodiment 1 includes two conductive intermediate members 25B each integrated with and supported by the insulation intermediate member 25A made of a resin material. In this case, these conductive intermediate members 25B are supported in parallel to each other and arranged such that both surfaces of the conductive intermediate member 25B, that is the sides on which the circular truncated cone-shaped projections 25C are formed are each positioned on the inside surface of the two-divided negative electrode substrate exposed portions 15. The insulation intermediate member 25A which constitutes the negative electrode intermediate member 25 and is made of a resin material is designed to have a prismatic form such that it is stably aligned and secured between the two-divided negative electrode substrate exposed portions 15 though it may have a desired form such as a prismatic form or columnar form.

Then, the negative electrode intermediate member 25 may be designed to have a length from 20 mm to tens of millimeters though the length differs depending on the size of the prismatic nonaqueous electrolyte secondary battery, and is preferably designed to have such a width as to be put into the condition where the side surface of the insulation intermediate member 25A made of a resin material is in contact with the inside surface of the two-divided negative electrode substrate exposed portion 15 after the resistance welding is finished, near the negative electrode intermediate member 25. However, in other parts, a groove may be formed on the outer periphery or a hollow part may be formed inside of these parts to improve degassing during resistance welding.

Then, as shown in FIG. 3, the flat wound electrode assembly 11 is disposed between a pair of resistance welding electrode rods 31 and 32 arranged vertically, the body part 18A where the rib 18B of the negative electrode collector 18 is formed is disposed facing the circular truncated cone-shaped projection 25C formed on each side of the conductive intermediate member 25B through the two-divided negative electrode substrate exposed portion 15, and the pair of resistance welding electrode rods 31 and 32 are each made to contact with the body part 18A of the negative electrode collector 18.

The negative electrode collector 18 may be arranged on each outermost surface of the negative electrode substrate exposed portion 15 either before or after the negative electrode intermediate member 25 is disposed between the two-divided negative electrode substrate exposed portions 15. Further, the negative electrode collector 18 may be connected with the negative electrode terminal 19 either before or after the negative electrode collector 18 is bonded with the negative electrode substrate exposed portion 15 by resistance welding. It is however preferable to bond the negative electrode collector 18 with the negative electrode substrate exposed portion 15 after the negative electrode collector 18 is connected with the negative electrode terminal 19 in advance, because the registration in the resistance welding is easy, which improves production efficiency.

Then, when moderate pressing pressure is applied to between the pair of resistance welding electrode rods 31 and 32 to carry out resistance welding in a predetermined condition, resistance welding current flows from, for example, the resistance welding electrode rod 31 to the body part 18A of the upper negative electrode collector 18, two-divided negative electrode substrate exposed portion 15, conductive intermediate member 25B, two-divided negative electrode substrate exposed portion 15, the body part 18A of the lower negative electrode collector 18, and resistance welding electrode rod 32. Resistance welded parts are formed between the body part 18A of the upper negative electrode collector 18, two-divided negative electrode substrate exposed portion 15, and one end surface of the conductive intermediate member 25B and between the other end surface of the conductive intermediate member 25B, two-divided negative electrode substrate exposed portion 15, and the body part 18A of the lower negative electrode collector 18.

At this time, the negative electrode collector 18 is formed so as to have an integrated structure symmetrical with respect to the negative electrode terminal 19 and therefore, short circuits are developed between the upper body part 18A and the lower body part 18A, allowing reactive current to flow. However, since the resistance welding current is large, the resistance welding can be efficiently carried out by properly keeping the pressing pressure between the pair of resistance welding electrode rods 31 and 32. Further, when this resistance welding is performed, the negative electrode intermediate member 25 is arranged between the two-divided negative electrode substrate exposed portions 15 in a stably aligned condition, which therefore makes it possible to perform resistance welding in a precise and stable state, and the dispersion of welding strength is limited, ensuring that a welding part reduced in resistance can be attained and it is therefore possible to produce a prismatic nonaqueous electrolyte secondary battery which can charge/discharge under large current.

The above Embodiment 1 shows an example of a structure with the circular truncated cone-shaped projections 25C being formed on both ends thereof as the conductive intermediate member 25B forming the negative electrode intermediate member 25. The formation of these circular truncated cone-shaped projections 25C is unnecessarily a structural requirement and these projections may not be formed. Further, though an example of a structure with the circular truncated cone-shaped projections 25C being formed is shown here, a triangular or square pyramid projection or further a truncated polygonal frustum projection may be used, or a projection having an opening (cave) at the tip part thereof may also be used. When no opening is formed in the projection, the function of the projection is the same as that of a projection formed when conventional resistance welding is carried out, whereas when an opening is formed at the tip side of the projection, current is focused on the periphery of the opening in resistance welding and therefore, the state of heat generation is improved, enabling better resistance welding to be performed.

Further, the first embodiment shows an example in which the positive electrode side is formed in the same manner as in the negative electrode side wherein the positive electrode intermediate member 24 provided with the insulation intermediate member 24A, conductive intermediate member 24B, and circular truncated cone-shaped projection 24C is disposed on the inside of the two-divided positive electrode substrate exposed portions 14, and the positive electrode collector 16 formed with the body part 16A, rib 16B, and groove part 16C (see FIG. 1) is disposed on the outermost surface of the positive electrode substrate exposed portions 14, to carry out resistance welding. Then, the periphery of the flat wound electrode assembly 11 mounted with the positive electrode collector 16 and negative electrode collector 18 in this manner is coated with the insulation sheet 23 and the electrode assembly is then inserted into a prismatic outer can 12. Then, the sealing plate 13 is bonded with the opening part of the outer can 12 by laser welding and then, a nonaqueous electrolyte solution is injected from the electrolyte solution injection port 22, followed by closing the electrolyte solution injection port 22 to thereby complete the prismatic nonaqueous electrolyte secondary battery 10 of the first embodiment.

Here, the specific structure and function of the negative electrode collector 18 in the prismatic nonaqueous electrolyte secondary battery 10 of the first embodiment will be explained. The negative electrode collector 18 is provided with the body part 18A and rib 18B and the rib 18B is formed with the groove part 18C in a direction along the body part 18A in a region excluding the tip part on the side opposite to the flat wound electrode assembly 11 of the rib 18B. This rib 18B is integrated with the body part 18A of the negative electrode collector 18 and formed by folding back a part of the negative electrode collector 18 at the boundary with the body part 18A at almost a right angle.

Though it is enough even if the angle is not a right angle, it may be preferably substantially close to a right angle, and may be deviated by about ±10 degrees from 90 degrees. Then, this rib 18B has the effect of preventing the diffusion of sputters generated from between the resistance welding electrode rod 31 or 32 and the body part 18A of the negative electrode collector 18 in the resistance welding and the effect of a radiation fin that serves to prevent the fusion of parts other than the resistance welded part of the negative electrode collector 18.

The tip 18D of the rib 18B is, as shown in FIG. 2A, more projected towards the outer can 12 side (outside) than the wound electrode assembly 11 and therefore, the effect of preventing the diffusion of sputters generated from between the resistance welding electrode rod 31 or 32 and the body part 18A of the negative electrode collector 18 towards the flat wound electrode assembly 11 side in the resistance welding. Further, the movement of the wound electrode assembly 11 in the outer can 12 is prevented because the tip 18D of the rib 18B is allowed to contact with the outer can 12 with the insulation sheet 23 interposed therebetween.

In addition, when the tip 18D of the rib 18B slightly projected toward the outer can 12 side more than the flat wound electrode assembly 11, the tip 18D of the rib 18B tends to break through the insulation sheet 23 when the outer can 12 is deformed by application of some external force in the case where the groove part 18C is not formed in the rib 18B. However, in the prismatic nonaqueous electrolyte secondary battery 10 of the first embodiment, the rib 18B is formed with the groove part 18C, and therefore, this part of the rib 18B is thinner. When force is applied to the rib 18B from the tip 18D, the tip 18D side of the rib 18B is easily bent at the position where the groove part 18C is formed. Specifically, in the prismatic nonaqueous electrolyte secondary battery 10 of the first embodiment, the region where the groove part 18C is formed in the rib 18B of the negative electrode collector 18 is defined as "easily bendable part" in the present invention.

For this, according to the prismatic nonaqueous electrolyte secondary battery 10 of the first embodiment, the tip 18D side of the rib 18B is easily bent at the position of the groove part 18C even if the outer can 12 is deformed by the application of external force, so that force is applied from the tip 18D of the rib 18B. Therefore, the fear that the tip 18D of the rib 18B breaks through the insulation sheet 23 is remarkably reduced, which also remarkably reduces the fear concerning the development of short circuits between the negative electrode collector 18 and the outer can 12.

The position where the groove part 18C is formed in the rib 18B of the negative electrode collector 18 is preferably formed in a region extended to ⅔ of the length of the rib 18B from the body part 18A of the negative electrode collector 18. When the groove part 18C is formed at a place other than the tip 18D of the rib 18B, it produces an effect that much. If the groove part 18C is formed in a region extended to ⅔ of the length of the rib 18B from the body part 18A of the negative electrode collector 18, the rib 18B is easily bent.

However, if the groove part 18C is formed at the tip 18D of the rib 18B, the tip 18D of the rib 18B tends to break through the insulation sheet 23, with the result that short circuits between the negative electrode collector 18 and the outer can 12 are easily developed. Further, a thin wall part which cannot be clearly recognized as a groove may be formed instead of the groove part 18C.

Figure 8:
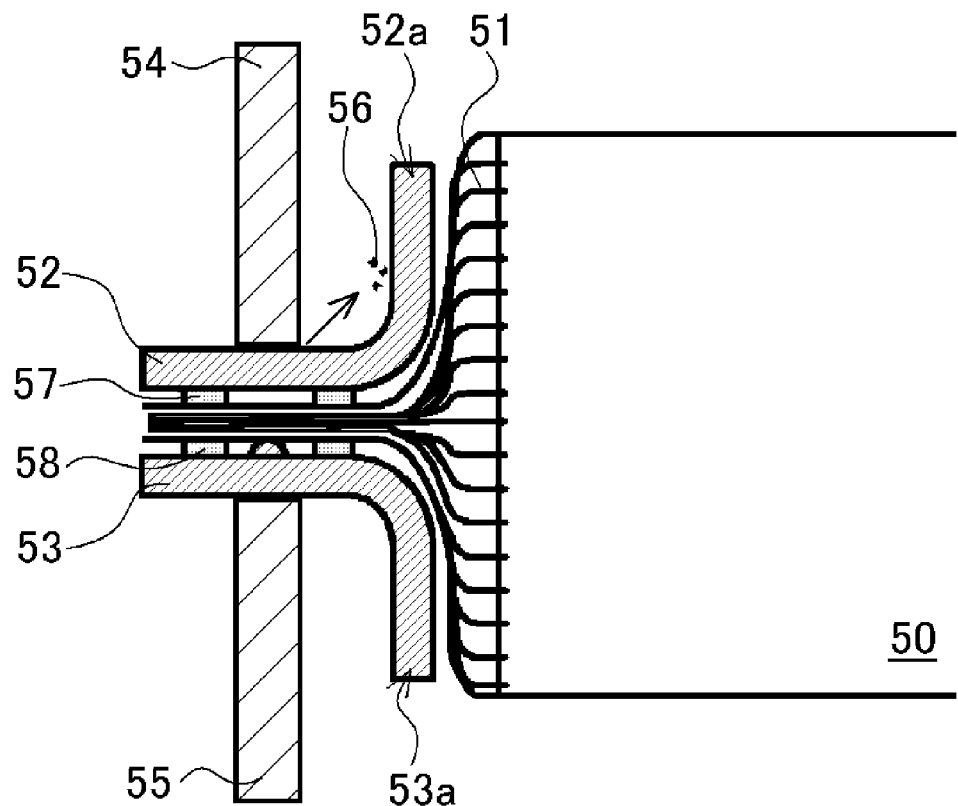
FIG. 8 is a side view illustrating the condition of an electrode substrate exposed portion and a current collector bonded with each other by resistance welding in a conventional example.

In the above embodiment 1, an example is shown in which the positive electrode intermediate member 24 and negative electrode intermediate member 25 are arranged between the two-divided positive electrode substrate exposed portions 14 and between the two-divided negative electrode substrate exposed portions 15 respectively. However, these positive electrode intermediate member 24 and negative electrode intermediate member 25 are not always necessary structures and may be formed in any one of the positive electrode substrate exposed portion 14 and negative electrode substrate exposed portion 15. Moreover, the positive electrode collector 16 and the negative electrode collector 18 may be connected with the positive electrode substrate exposed portion 14 and negative electrode substrate exposed portion 15 respectively without using the positive electrode intermediate member 24 and negative electrode intermediate member 25, that is, without halving the positive electrode substrate exposed portion 14 and negative electrode substrate exposed portion 15 similarly to the conventional example shown in FIG. 8.

<Modifications 1 and 2>

The above Embodiment 1 shows an example in which the negative electrode collector is made to contact with each outermost surface of the two-divided negative electrode substrate exposed portion 15. However, in the present invention, it is unnecessarily required that the negative electrode collector 18 connected with the negative electrode terminal 19 is made to contact with each outermost surface of the two-divided negative electrode substrate exposed portion 15 and it is enough to make the negative electrode collector 18 contact with at least one outermost surface of the two-divided negative electrode substrate exposed portion 15.

Figure 4A:
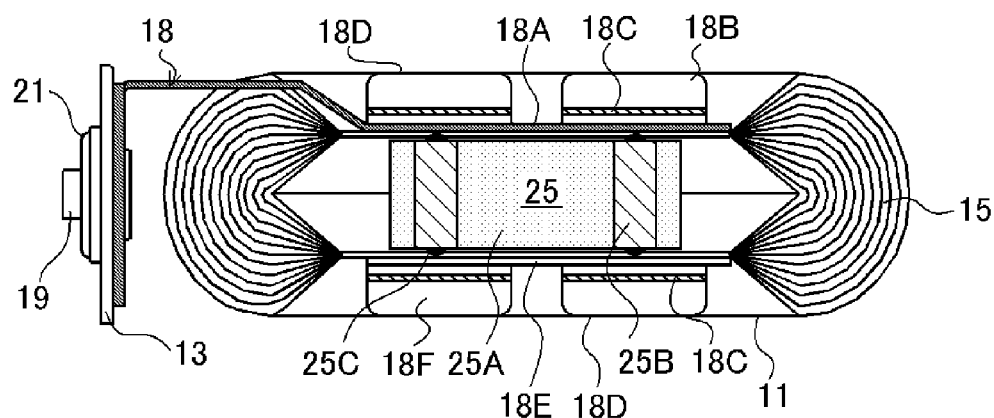
FIG. 4A is a sectional view of a part along the line IB-IB of FIG. 1A corresponding to Modification 1 and FIG. 4B is a sectional view of a part along the line 1B-1B of FIG. 1A corresponding to Modification 2.
Figure 4B:
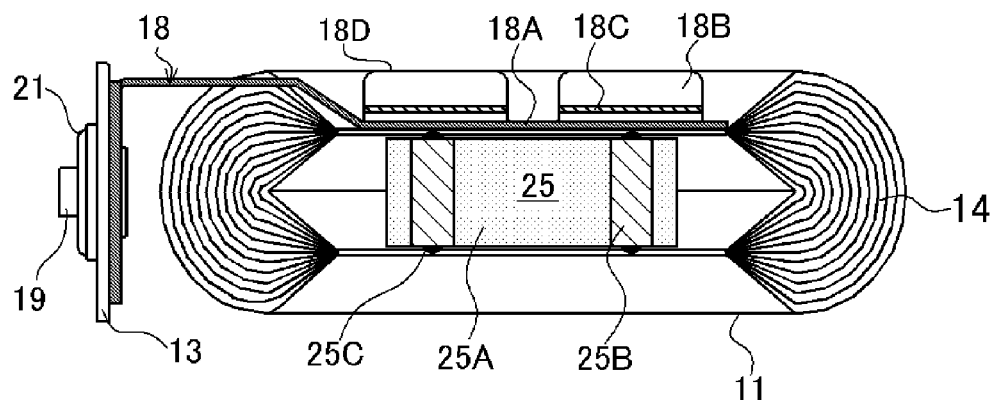

The following explanations are furnished as to the arrangement state of the negative electrode collector 18 after the resistance welding in Modifications 1 and 2 in which the negative electrode collector 18 connected with the negative electrode terminal 19 is made to contact with at least one outermost surface of the two-divided negative electrode substrate exposed portion 15 with reference to FIGS. 4A and 4B. Here, FIG. 4A is a partially sectional view along the line IB-IB of FIG. 1A corresponding to Modification 1 and FIG. 4B is a partially sectional view along the line IB-IB of FIG. 1A corresponding to Modification 2. In this case, the same structures as those of the flat wound electrode assembly 11 and negative electrode intermediate member 25 are used in Modifications 1 and 2. The same structural parts as those used in Embodiment 1 are designated by the same reference signs and detailed explanations of these parts are omitted in Modifications 1 and 2.

In Modification 1, the body part 18A of the negative electrode collector 18 connected with the negative electrode terminal 19 is, as shown in FIG. 4A, arranged in contact with one outermost surface of the two-divided negative electrode substrate exposed portion 15 and a negative electrode collector receiving member 18E is arranged in contact with the other outermost surface of the two-divided negative electrode substrate exposed portion 15 and a pair of resistance welding electrode rods are brought into contact with between the negative electrode collector 18 and the negative electrode collector receiving member 18E to conduct resistance welding. In this case, in Modification 1, the negative electrode collector receiving member 18E is not electrically connected directly with the negative electrode terminal 19 and serves to receive one side of the pair of resistance welding electrode rods in the resistance welding. The negative electrode collector receiving member 18E of this Modification 1 is provided with a rib 18F formed by folding and a groove part 18C is formed in this rib 18F. The formation of the groove 18C in the rib 18F ensures that the negative electrode collector receiving member 18E has substantially the same action effect as in the case of Embodiment 1.

Specifically, the negative electrode collector receiving member 18E has substantially the same effect as the negative electrode collector 18 except that it is not connected directly with the negative electrode terminal 19. For this, the term "current collector" in the present invention is used in the sense involving the word "collector receiving member" like this. In this case, the resistance welding can be conducted in more physically stable condition when the negative electrode current member is disposed on each outermost surface of the two-divided electrode substrate exposed portions than when the negative electrode collector receiving member 18E is used.

Further, in Modification 2, the negative electrode collector 18 is, as shown in FIG. 4B, arranged in contact with on one outermost surface of the negative electrode substrate exposed portion 15 and no negative electrode collector is arranged on the other outermost surface of the two-divided positive electrode substrate exposed portion 14. A pair of resistance welding electrodes is brought into contact with between the negative electrode collector 18 and the other side of the two-divided negative electrode substrate exposed portion 15 to carry out resistance welding. Specifically, in this Modification 2, one side of the pair of resistance welding electrode is made to contact directly with the other outermost surface of the two-divided negative electrode substrate exposed portion 15 in the resistance welding to carry out resistance welding. Even if a structure like this Modification 2 is used, not perfect but good resistance welding can be accomplished by a projection effect produced by the circular truncated cone-shaped projection 25C of the conductive intermediate member 25B of the negative electrode intermediate member 25. However, since there is the possibility of fusion between the resistance welding electrode and the other outermost surface of the negative electrode substrate exposed portion 15, it is desirable to arrange the negative electrode collector 18 or negative electrode collector receiving member 18E on the other outermost surface of the negative electrode substrate exposed portion 15 similarly to the case of Embodiment 1 or Modification 1.

Embodiments 2 and 3

The above Embodiment 1 and Modifications 1 and 2 show examples in which the groove part 18C for forming an easily bendable part in the rib 18B of the negative electrode collector 18 is formed at the position apart from the body part 18A in the rib 18B on the side opposite to the flat wound electrode assembly 11. However, the groove part 18C for forming the easily bendable part may be disposed at a place adjacent to the body part 18A or in the rib 18B on the flat wound electrode assembly 11 side except for the tip of the rib 18B. An example in which the groove part 18C is disposed at a place adjacent to the body part 18A and an example in which the groove part 18C is disposed in the rib 18B on the flat wound electrode assembly 11 side are explained in Embodiments 2 and 3 with reference to FIGS. 5 and 6 respectively.

Figure 5A:
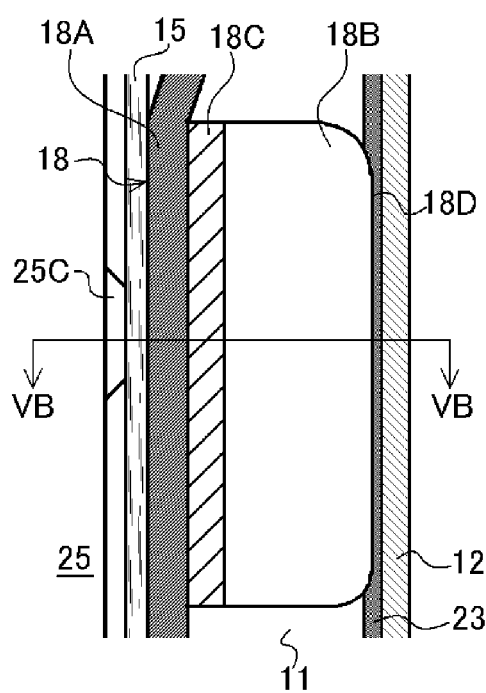
FIG. 5A is an enlarged view of a part corresponding to the IIA part of FIG. 1B in the case of Embodiment 2 and FIG. 5B is a sectional view along the line VB-VB of FIG. 5A.
Figure 5B:
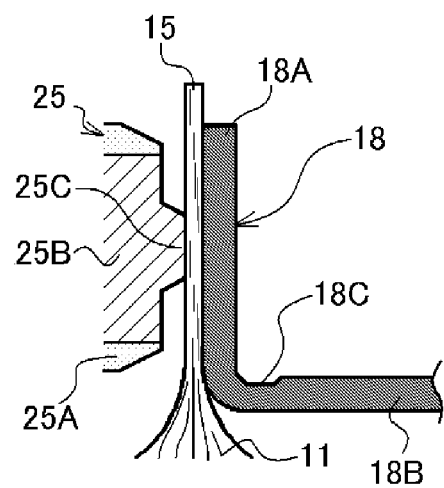
Figures 6A, 6B:
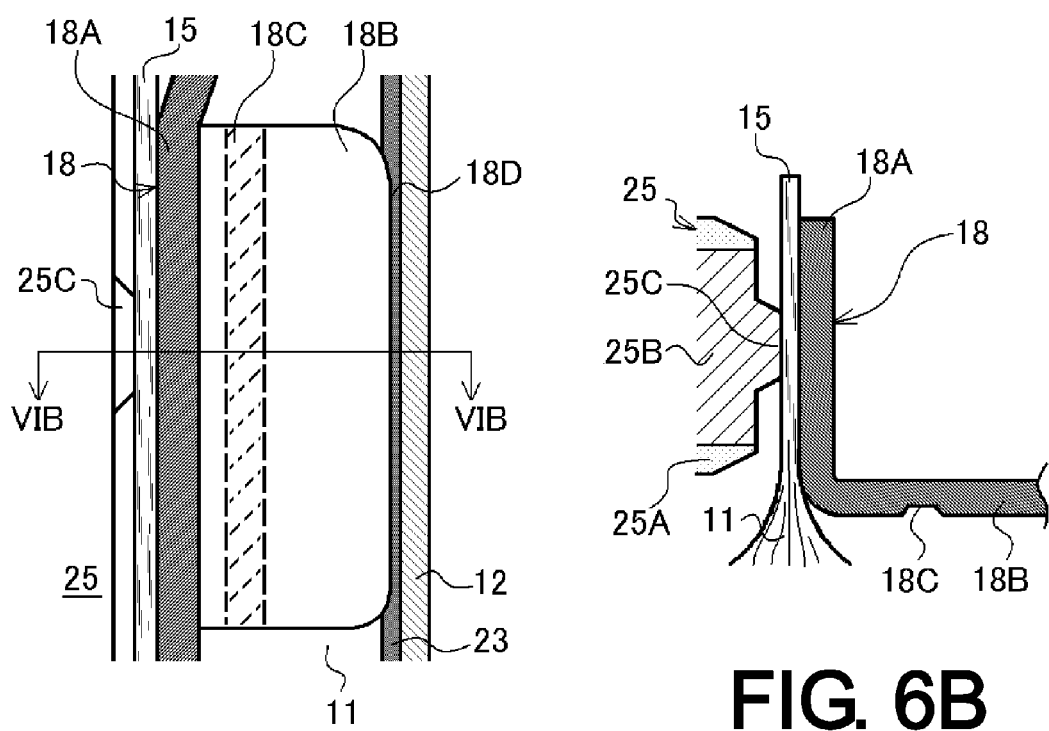
FIG. 6A is an enlarged view of a part corresponding to the IIA part of FIG. 1B in the case of Embodiment 3 and FIG. 6B is a sectional view along the line VIB-VIB of FIG. 6A.

FIG. 5A is an enlarged view of a part corresponding to the IIA part of FIG. 1B in the case of Embodiment 2 and FIG. 5B is a sectional view along the line VB-VB of FIG. 5A. FIG. 6A is an enlarged view of a part corresponding to the IIA part of FIG. 1B in the case of Embodiment 3 and FIG. 6B is a sectional view along the line VIB-VIB of FIG. 6A. Further, the same structures as those of the flat wound electrode assembly 11 and the negative electrode intermediate member 25 are used in Embodiments 2 and 3. The same structural parts as those used in Embodiment 1 are designated by the same reference signs and detailed explanations of these parts are omitted in Embodiments 2 and 3.

In Embodiment 2, the groove part 18C for forming an easily bendable part in the rib 18B of the negative electrode collector 18 is disposed at a place adjacent to the body part 18A in a direction along the body part 18A. When such a structure is adopted, the tip side of the rib 18B is largely deformed even if the degree of deformation of the outer can 12 is large and therefore, the development of short circuits between the negative electrode collector 18 and the outer can 12 is reduced.

Also in Embodiment 3, the groove part 18C for forming an easily bendable part in the rib 18B of the negative electrode collector 18 is disposed on the flat wound electrode assembly 11 side of the rib 18B in a direction along the body part 18A on the contrary to the case of Embodiment 1. Even if such a structure is used, it can produce substantially the same action effect as in the case of Embodiment 1.

Embodiment 4

Figure 7A:
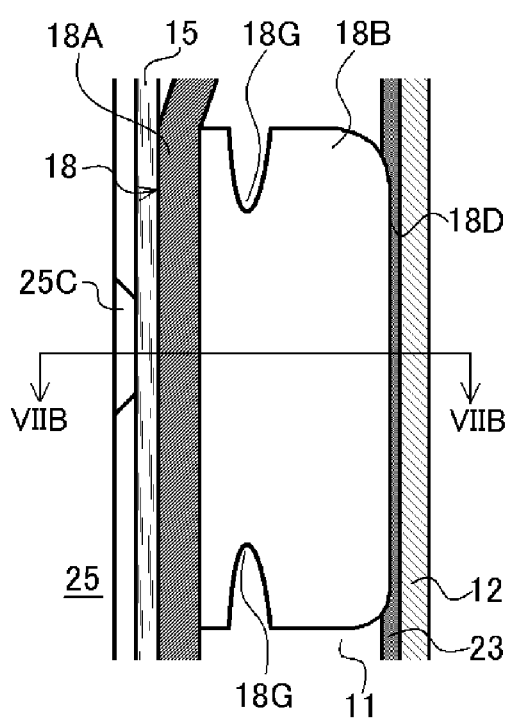
FIG. 7A is an enlarged view of a part corresponding to the IIA part of FIG. 1B in the case of Embodiment 4 and FIG. 7B is a sectional view along the line VIIB-VIIB of FIG. 7A.
Figure 7B:
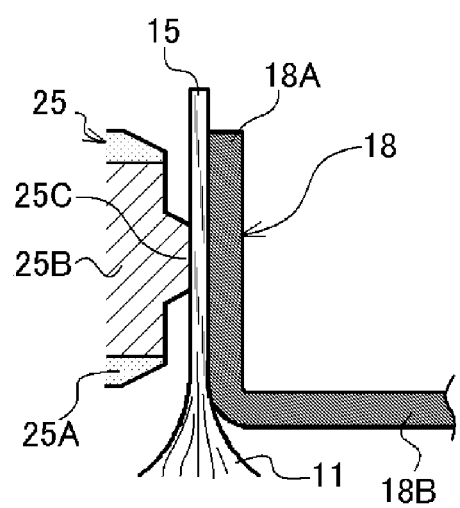

The above Embodiments 1 to 3 and Modifications 1 and 2 show examples in which the groove part 18C is formed in a direction along the body part 18A to form an easily bendable part in the rib 18B of the negative electrode collector 18. However, since the easily bendable part is only required to prevent the tip 18D of the rib 18B from breaking through the insulation sheet 23 by the deformation of the rib 18B when the external force is applied from the tip 18D of the rib, a notch reducing the width of the rib 18B in a direction along the body part 18A of the rib 18B may be formed instead of the groove part 18C. An example of this Embodiment 4 will be explained with reference to FIG. 7. Here, FIG. 7A is an enlarged view of a part corresponding to the IIA part of FIG. 1B in the case of the Embodiment 4 and FIG. 7B is a sectional view along the line VIIB-VIIB of FIG. 7A.

In Embodiment 4, two notches 18G are formed on both sides of the rib 18B in a direction along the body part 18A of the rib 18B excluding the tip 18D of the rib 18B in order to form an easily bendable part in the rib 18B of the negative electrode collector 18. When such a structure is adopted, the rib 18B is easily bendable in the region where the notch 18G is formed when external force is applied to the tip 18D of the rib 18B and therefore, the same action effect as in the case of Embodiment 1 can be produced. Here, a narrow opening may be formed in the rib 18B in a direction along the body part 18A of the rib 18B instead of forming the notches 18G in the rib 18B.

Though it is enough for the easily bendable part formed in the rib of the current collector in the present invention that it is formed on at least one of the positive electrode plate side and negative electrode plate side, it is preferable to provide it to the rib 18B disposed in at least the negative electrode collector 18 because the negative electrode collector 18 made of copper is harder than the positive electrode collector 16 made of aluminum when the present invention is applied to a nonaqueous electrolyte secondary battery. Further, the prismatic battery of the present invention may be applied to each flat type electrode assembly produced by winding or laminating a positive electrode plate and negative electrode plate with a separator interposed therebetween and may be applied any battery irrespective of whether it is a primary battery or secondary battery.

Further, the aforementioned "laminated positive electrode substrate exposed portion" and "laminated negative electrode substrate exposed portion" may be those produced by laminating positive electrode plates each provided with a positive electrode substrate exposed portion on one end thereof and negative electrode plates each provided with a negative electrode substrate exposed portion on the other end thereof on each other with a separator being interposed between a pair of positive and negative electrode plates or those laminated by winding these positive and negative electrode plates with a separator interposed therebetween. Moreover, although the above embodiment shows an example in which the connection between the positive electrode collector and the outermost surface of the laminated positive electrode substrate exposed portion and the connection between the negative electrode collector and the outermost surface of the laminated negative electrode substrate exposed portion are attained by resistance welding, these connections may be attained by welding using high-energy rays such as laser light or electron beams, or ultrasonic welding. In this case, the rib of the current collector can also produce at least an action effect of registration of the flat electrode assembly in the outer can.

REFERENCE SIGNS LIST

10: Prismatic nonaqueous electrolyte secondary battery
11: Flat wound electrode assembly
12: Outer can
13: Sealing plate
14: Positive electrode substrate exposed portion
15: Negative electrode substrate exposed portion
16: Positive electrode collector
16A: Body part (of the positive electrode collector)
16B: Rib (of the positive electrode collector)
16C: Groove part (of the positive electrode collector)
17: Positive electrode terminal
18: Negative electrode collector 18A: Body part (of the negative electrode collector)
  18B: Rib (of the negative electrode collector)
  18C: Groove part (formed in the rib)
  18D: Tip (of the rib)
  18E: Negative electrode collector receiving member
  18F: Rib (of the negative electrode collector receiving member)
  18G: Notch
  19: Negative electrode terminal
  20, 21: Insulation member
  22: Electrolyte solution injection port
  23: Resin sheet
  24: Positive electrode intermediate member
  24A: Insulation intermediate member (of the positive electrode intermediate member)
  24B: Conductive intermediate member (of the positive electrode intermediate member)

24C: Circular truncated cone-shaped projection (of the positive electrode intermediate member)
25: Negative electrode intermediate member
25A: Insulation intermediate member (of the negative electrode intermediate member)
25B: Conductive intermediate member (of the negative electrode intermediate member)
25C: Circular truncated cone-shaped projection (of the negative electrode intermediate member)
31, 32: Resistance welding electrode rod

The invention claimed is:

1. A prismatic battery comprising:
an outer can comprising
an opening,
a bottom,
a first side wall,
a second side wall,
a third side wall, and
a fourth side wall,
the first side wall and the second side wall being disposed substantially in parallel to each other,
the third side wall and the fourth side wall being disposed substantially in parallel to each other, each of the first, second, third and fourth side walls being disposed substantially in perpendicular to the bottom;
a sealing plate sealing the opening of the outer can;
a flat electrode assembly provided with a positive electrode substrate exposed portion laminated on one end thereof and a negative electrode substrate exposed portion laminated on the other end thereof, the flat electrode assembly being accommodated in the outer can; and
a current collector which is connected with an outermost surface of at least one of the laminated positive electrode substrate exposed portion and the laminated negative electrode substrate exposed portion in a laminated direction;
the current collector being provided with the body thereof and a rib extended in a direction substantially perpendicular to the body of the current collector, the rib being disposed substantially perpendicular to the first side wall of the outer can, wherein
an insulation member is disposed between the rib and the first side wall of the outer can,
the rib is formed with an easily bendable part in a region excluding a tip part of the rib, and
the bendable part is provided with a thin-wall part, a groove part, an opening part, or a notch part which narrows the width of the rib.

2. The prismatic battery according to claim 1, wherein the easily bendable part formed in the rib is located within a region extended up to ⅔ of the length of the rib from the current collector body of the rib.

3. The prismatic battery according to claim 1, wherein the rib is more projected towards the outer can side than the electrode assembly.

4. The prismatic battery according to claim 1, wherein the rib is formed by folding back a part of the current collector.

5. The prismatic battery according to claim 1, wherein the rib is formed at a base side of the current collector on the positive electrode substrate exposed portion side or on the negative electrode substrate part side.

6. The prismatic battery according to claim 1, wherein
at least one of the positive electrode substrate exposed portion and the negative electrode substrate exposed portion is divided into two sections to form a two-divided portion between which an intermediate member is disposed, the intermediate member including a resin material and at least one conductive intermediate member which is supported by the resin material, and
the current collector on the two-divided portion side is disposed on at least one outermost surface of the two-divided portion and is electrically connected with the two-divided portion together with the at least one conductive intermediate member of the intermediate member by a resistance welding method.

7. The prismatic battery according to claim 1,
wherein the body of the current collector has a main region disposed on the outermost surface of at least one of the laminated positive electrode substrate exposed portion and the laminated negative electrode substrate exposed portion in a laminated direction, and
wherein the main region of the body of the current collector is disposed substantially in parallel to the first side wall of the outer can.

8. The prismatic battery according to claim 1,
wherein the body of the current collector has a main region disposed on the outermost surface of at least one of the laminated positive electrode substrate exposed portion and the laminated negative electrode substrate exposed portion in a laminated direction,
wherein a shortest distance between the third side wall of the outer can and the main region of the body of the current collector is less than a shortest distance between the fourth side wall of the outer can and the main region of the body of the current collector, and
wherein a shortest distance between the third side wall of the outer can and the main region of the body of the current collector is less than a shortest distance between the third side wall of the outer can and the rib of the current collector.

9. The prismatic battery according to claim 1,
wherein the body of the current collector has a welded portion that is welded with the outermost surface of at least one of the laminated positive electrode substrate exposed portion and the laminated negative electrode substrate exposed portion in a laminated direction,
wherein a shortest distance between the first side wall of the outer can and the welded portion of the body of the current collector is less than a shortest distance between the second side wall of the outer can and the welded portion of the body of the current collector, and
wherein the body of the current collector is disposed between the first side wall of the outer can and the at least one of the laminated positive electrode substrate exposed portion and the laminated negative electrode substrate exposed portion which is connected with the body of the current collector.

10. The prismatic battery according to claim 9, wherein a shortest distance between the rib and the first side wall is less than a shortest distance between the welded portion of the body and the first side wall.

11. The prismatic battery according to claim 1,
wherein the body of the current collector has a main region disposed on the outermost surface of at least one of the laminated positive electrode substrate exposed portion and the laminated negative electrode substrate exposed portion in a laminated direction,
wherein the flat electrode assembly comprises a wound electrode assembly having a winding axis,
wherein the main region has one end near to the middle of the wound electrode assembly in a direction of the winding axis, and
wherein the rib is disposed on the one end of the main region.

12. The prismatic battery according to claim 1, further comprising:
a positive electrode plate;
a positive electrode terminal being electrically connected with the positive electrode plate and being attached to the sealing plate;
a negative electrode plate; and
a negative electrode terminal being electrically connected with the negative electrode plate and being attached to the sealing plate.

13. The prismatic battery according to claim 1, wherein an area of the first side wall of the outer can and an area of the second side wall of the outer can are greater than each of an area of the third side wall of the outer can and an area of the fourth side wall of the outer can.

14. The prismatic battery according to claim 1, wherein the rib is formed with the groove part on a surface opposite to the third side wall.

15. A prismatic battery comprising:
an outer can comprising an opening, a bottom, a first side wall, a second side wall, the first side wall and the second side wall being disposed substantially in parallel to each other, the first and second side walls being disposed substantially perpendicular to the bottom;
a sealing plate sealing the opening of the outer can;
a flat electrode assembly provided with a positive electrode substrate exposed portion laminated on one end thereof and a negative electrode substrate exposed portion laminated on the other end thereof, the flat electrode assembly being accommodated in the outer can; and
a current collector which is connected with one of the laminated positive electrode substrate exposed portion and the laminated negative electrode substrate exposed portion, the current collector comprising
  a first body portion connected with one outermost surface of the one of the laminated positive electrode substrate exposed portion and the negative electrode substrate exposed portion in a laminated direction,
  a second body portion connected with the other outermost surface of the one of the laminated positive electrode substrate exposed portion and the negative electrode substrate exposed portion in a laminated direction,
  a first rib extended from the first body portion in a direction substantially perpendicular to the first body portion, and
  a second rib extended from the second body portion in a direction substantially perpendicular to the second body portion,
wherein an insulation member is disposed between the first rib and the first side wall of the outer can and between the second rib and the second side wall of the outer can,
wherein each of the first rib and the second rib is formed with an easily bendable part in a region excluding a tip part thereof, and
wherein the bendable part is provided with a thin-wall part, a groove part, an opening part, or a notch part which narrows the width of the first rib or the second rib.

16. The prismatic battery according to claim 15, wherein the one of the laminated positive electrode substrate exposed portion and the laminated negative electrode substrate exposed portion is disposed between the first body portion and the second body portion.

17. The prismatic battery according to claim 15,
wherein the first rib is disposed perpendicular to the first side wall, and
wherein the second rib is disposed perpendicular to the second side wall.

18. The prismatic battery according to claim 15, wherein
the flat electrode assembly comprises a wound electrode assembly having a winding axis,
the first body portion has one end near to the middle of the wound electrode assembly in a direction of the winding axis,
wherein the first rib is disposed on the one end of the first body portion,
the second body portion has one end near to the middle of the wound electrode assembly in the direction of the winding axis, and
wherein the second rib is disposed on the one end of the second body portion.

19. The prismatic battery according to claim 15,
wherein the outer can further comprises a third side wall and fourth side wall,
wherein the third side wall and the fourth side wall are disposed substantially in parallel to each other,
wherein the third side wall and the fourth side wall are disposed substantially perpendicular to the bottom,
wherein a shortest distance between the third side wall and the first body portion is less than a shortest distance between the fourth side wall and the first body portion, and
wherein a shortest distance between the third side wall and the first body portion is less than a shortest distance between the third side wall and the first rib.

20. The prismatic battery according to claim 15, further comprising:
a positive electrode plate;
a positive electrode terminal electrically connected to the positive electrode plate, the positive electrode terminal being attached to the sealing plate;
a negative electrode plate; and
a negative electrode terminal electrically connected to the negative electrode plate, the negative electrode terminal being attached to the sealing plate,
wherein the outer can further comprises a third side wall and fourth side wall,
wherein the third side wall and the fourth side wall are disposed substantially in parallel to each other,
wherein each of the first side wall and the second side wall has an area larger than each of an area of the third side wall and an area of the fourth side wall,
wherein the flat electrode assembly comprises a wound electrode assembly having a winding axis,
wherein the wound electrode assembly is stored in the outer can, and
wherein the winding axis of the wound electrode assembly is substantially in parallel to the bottom.

* * * * *